(12) United States Patent
Yanai

(10) Patent No.: US 8,955,978 B2
(45) Date of Patent: Feb. 17, 2015

(54) POLARIZATION CONVERSION DEVICE AND PROJECTOR SYSTEM

(71) Applicant: Seiko Epson Corporation, Tokyo (JP)

(72) Inventor: Hiroaki Yanai, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 185 days.

(21) Appl. No.: 13/682,453

(22) Filed: Nov. 20, 2012

(65) Prior Publication Data

US 2013/0148084 A1     Jun. 13, 2013

(30) Foreign Application Priority Data

Dec. 12, 2011   (JP) ................................. 2011-270966

(51) Int. Cl.

| | |
|---|---|
| *G03B 21/14* | (2006.01) |
| *G03B 21/16* | (2006.01) |
| *G02B 5/30* | (2006.01) |
| *G02B 27/28* | (2006.01) |
| *G03B 35/26* | (2006.01) |
| *H04N 13/04* | (2006.01) |

(52) U.S. Cl.
CPC ............... *G03B 21/16* (2013.01); *G02B 5/3025* (2013.01); *G02B 27/286* (2013.01); *G03B 35/26* (2013.01); *H04N 13/0434* (2013.01)
USPC ............ 353/20; 353/7; 353/8; 353/99; 349/5; 349/7; 349/9

(58) Field of Classification Search
CPC ...... G02B 1/10; G02B 5/3083; G02B 5/3016; G02B 27/283; G02B 27/281; G02F 1/133536
USPC ......... 353/7, 8, 20, 30, 31, 33, 34, 37, 38, 98, 353/99; 349/5, 7, 9, 15, 18, 95, 96–103, 349/112; 359/93, 48, 38, 53, 73, 101, 359/485.01, 485.03, 485.05, 485.06, 359/485.07, 636, 489.07
See application file for complete search history.

(56) References Cited

U.S. PATENT DOCUMENTS

| | | | | |
|---|---|---|---|---|
| 5,221,982 | A * | 6/1993 | Faris | 349/115 |
| 6,549,335 | B1 | 4/2003 | Trapani et al. | |
| 6,827,452 | B2 * | 12/2004 | Tzong et al. | 353/33 |
| 2002/0141058 | A1 * | 10/2002 | Itoh | 359/487 |
| 2005/0041213 | A1 * | 2/2005 | Paukshto | 353/20 |
| 2007/0206156 | A1 | 9/2007 | Quach | |
| 2009/0103178 | A1 | 4/2009 | Woodgate et al. | |
| 2009/0161073 | A1 * | 6/2009 | Kobayashi et al. | 353/20 |
| 2011/0032483 | A1 * | 2/2011 | Hruska et al. | 353/8 |
| 2011/0181838 | A1 * | 7/2011 | Yokoyama et al. | 353/20 |

FOREIGN PATENT DOCUMENTS

| | | |
|---|---|---|
| JP | U-63-92302 | 6/1988 |
| JP | A-6-18818 | 1/1994 |
| JP | A-2004-505316 | 2/2004 |
| JP | A-2005-43656 | 2/2005 |
| JP | A-2009-122659 | 6/2009 |
| JP | A-2009-529144 | 8/2009 |

* cited by examiner

*Primary Examiner* — Sultan Chowdhury
(74) *Attorney, Agent, or Firm* — Oliff PLC

(57) ABSTRACT

An external polarization conversion device used for a projector includes a first element which converts light from the projector to polarized light in a uniform polarization direction, and a second element which is arranged in a position subsequent to the first element in such a way that there is a space between the first element and the second element and which converts the polarized light from the first element to predetermined polarized light that is different from the polarized light from the first element.

6 Claims, 5 Drawing Sheets

POLARIZATION CONVERSION DEVICE AND PROJECTOR SYSTEM

BACKGROUND

1. Technical Field

The present invention relates to a polarization conversion device and a projector system.

2. Related Art

According to a related art, a polarization conversion device which is used for a projector and includes a polarizer arranged in a position preceding a projection lens of the projector and a ½ wave plate arranged in a position subsequent to the projection lens is known (see, for example, JP-A-2005-43656). With the related-art polarization conversion device, light emitted from the projector can be projected onto a screen as a projection image formed by light in a uniform polarization direction.

Such a projection image formed by light in a uniform polarization direction can be used, for example, to project a stereoscopic projection image.

However, the related-art polarization conversion device has a problem that optical elements involved in polarization (the polarizer and the ½ wave plate in the related-art polarization conversion element) are distorted or are deteriorated in a short period. If the optical elements are distorted, the optic axis is shifted, causing the occurrence of in-plane unevenness of phase difference and hence the occurrence of in-plane unevenness of luminous intensity and in-plane unevenness of color in the projection image. Also, if the optical elements are deteriorated, the polarization conversion device cannot be used.

SUMMARY

An advantage of some aspects of the invention is that a polarization conversion device in which distortion of optical elements involved in polarization and deterioration of these optical elements in a short period can be restrained is provided. Another advantage is that a projector system having the polarization conversion device is provided.

As a result of extensive studies, the inventor of the invention has found that if a polarization conversion device is arranged partly or entirely within a projector or if optical elements involved in polarization are made to contact each other tightly, the optical elements involved in polarization easily overheat and consequently the optical elements are distorted or are deteriorated in a short period. As the optical elements involved in polarization, organic materials which are inexpensive but susceptible to heat are broadly used. In this case, the problem of overheating in the polarization conversion device becomes even more serious. Based on the above finding, the invention includes the following configurations.

A polarization conversion device according to an aspect of the invention is an external polarization conversion device used for a projector. The polarization conversion device includes a first element which converts light from the projector to polarized light in a uniform polarization direction, and a second element which is arranged in a position subsequent to the first element in such a way that there is a space between the first element and the second element and which converts the polarized light from the first element to predetermined polarized light that is different from the polarized light from the first element.

According to this polarization conversion device, since the second element is arranged in such a way that there is a space between the first element and the second element, the space between the first element and the second element can promote heat radiation from the first element and the second element. Consequently, distortion of the optical elements involved in polarization (first element and second element) and deterioration of these optical elements in a short period can be restrained.

Also, according to this polarization conversion device, since distortion of the optical elements involved in polarization (first element and second element) and deterioration of these optical elements in a short period can be restrained, polarized light in a very good state of polarization (the state showing how uniform the polarized light is) can be generated.

Also, according to this polarization conversion device, the space between the first element and the second element can restrain heat conduction from the first element to the second element and can particularly restrain overheating of the second element.

Moreover, according to this polarization conversion device, since the device is an external polarization conversion device, the optic axes (transmission axes, slow axes and the like) of the first element and the second element can be accurately aligned by fixing the positional relation between the first element and the second element.

Also, according to this polarization conversion device, since the first element and the second element are provided, light emitted from the projector can be projected onto a screen as a projection image formed by light in a uniform polarization direction, as in the case of the related-art polarization conversion device.

It is preferable that the polarization conversion device according to the aspect of the invention further includes a cooling device which cools the first element and the second element.

By employing such a configuration, the first element and the second element can be cooled actively. Consequently, distortion of the optical elements involved in polarization (first element and second element) and deterioration of these optical elements in a short period can be restrained more effectively.

In the polarization conversion device according to the aspect of the invention, it is preferable that the cooling device is a device which circulates a coolant in the space between the first element and the second element and thereby cools the first element and the second element.

By employing such a configuration, the first element and the second element can be cooled efficiently.

As the cooling device, for example, a cooling device using a blower fan can be used. In this case, air can be used as the coolant.

In the polarization conversion device according to the aspect of the invention, it is preferable that the first element converts the light from the projector to linearly polarized light in a uniform polarization direction and that the second element converts the linearly polarized light from the first element to circularly polarized light in a uniform rotation direction.

Circularly polarized light is less dependent on reflection angles than linearly polarized light is. Therefore, by employing such a configuration, angle dependence of polarized light converted by the polarization conversion device can be reduced.

In the case of a projector system, since viewers view a projection image from various directions and distances, the foregoing effect is very important when a projection image with little angle dependence is projected, using the polarization conversion device in the projector system.

A projector system according to another aspect of the invention includes a projector and the foregoing polarization conversion device.

According to this projector system, since the system includes the polarization conversion device in which distortion of the optical elements involved in polarization (first element and second element) and deterioration of these optical elements in a short period can be restrained, the projector system can be highly reliable and provide an accurate projection image.

It is preferable that the projector system further includes a screen and polarizing spectacles as other components.

In this case, as the screen, a screen with high gain (having a high reflectance of a specific angular component such as regular reflection) may be used preferably.

In the projector system according to the aspect of the invention, it is preferable that a projection image that can be recognized as a three-dimensional image is projected.

By employing such a configuration, an accurate three-dimensional image can be projected using the polarization conversion device.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
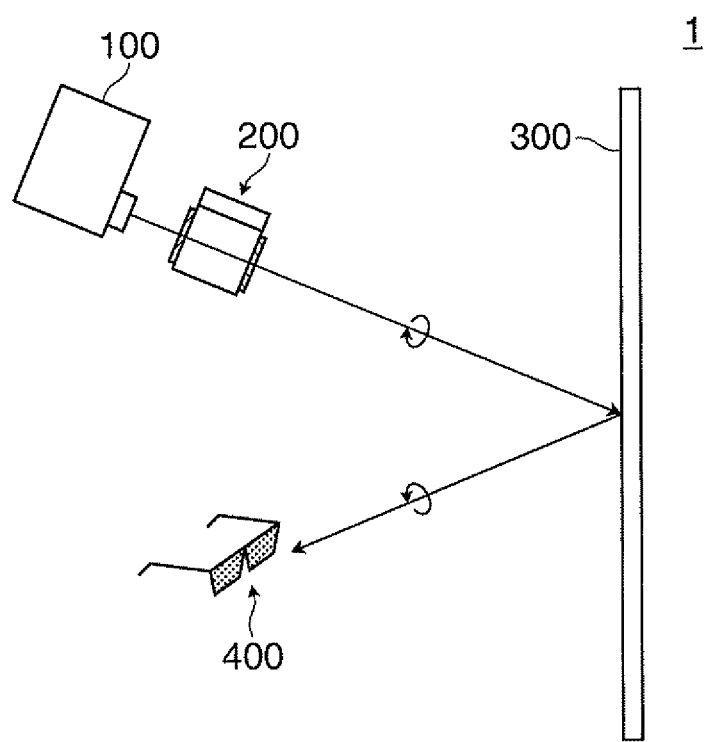
FIG. 1 is an explanatory view of a projector system according to Embodiment 1.

Hereinafter, a polarization conversion device and a projector system according to the invention will be described with reference to embodiments shown in the drawings.
Embodiment 1

FIG. 1 is an explanatory view of a projector system 1 according to Embodiment 1. FIG. 1 is a schematic view assuming that the projector system 1 is viewed from above. An arrow heading toward polarizing spectacles 400 from a projector 100 shows a simplified traveling path of light. Circular arrows attached to the above arrow indicate that the light is circularly polarized light. This also applies to FIG. 3 and FIG. 6, later described.

Figure 2A:
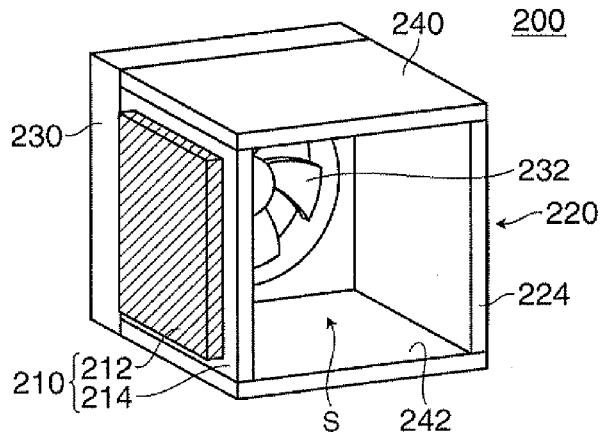
FIGS. 2A to 2C are explanatory views of a polarization conversion device according to Embodiment 1.
Figure 2B:
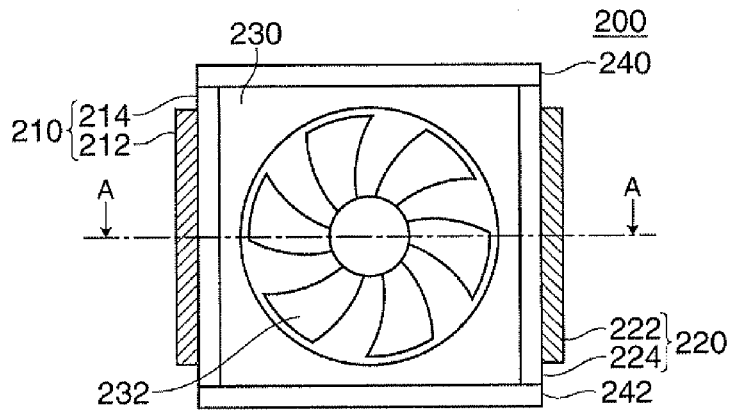
Figure 2C:
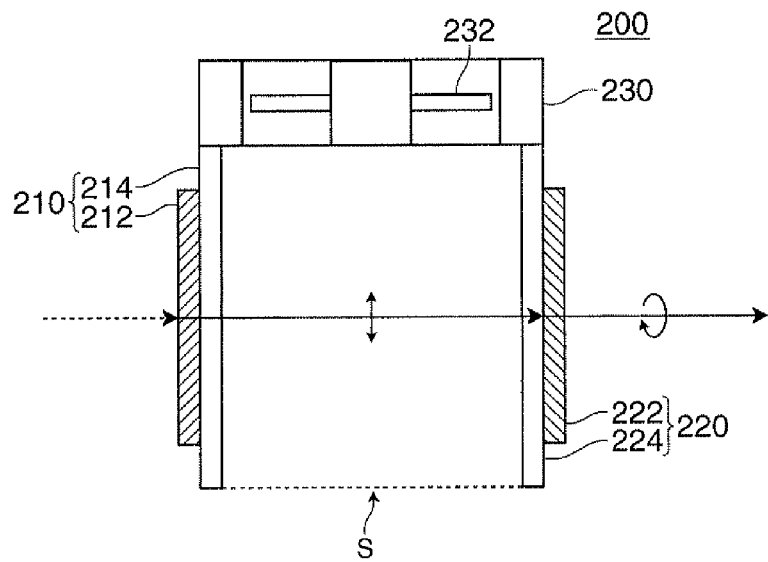

FIGS. 2A to 2C are explanatory views of a polarization conversion device 200 according to Embodiment 1. FIG. 2A is a perspective view of the polarization conversion device 200. FIG. 2B is a side view of the polarization conversion device 200. FIG. 2C is an A-A sectional view of FIG. 2B. "Lateral cross-sectional views" as in FIGS. 9 and 5, which will be described later, refer to sectional views equivalent to FIG. 2C.

A dashed line with arrow in FIG. 2C shows a simplified optical axis of light in non-uniform polarization directions. Also, double arrows attached to a solid line with arrow indicate that the light at that position is made up of linearly polarized light. A circular arrow attached to the solid line with arrow indicates that the light at that position is made up of circularly polarized light. This also applies to FIGS. 4 and 5, which will be described later.

First, the projector system 1 according to Embodiment 1 will be described.

The projector system 1 according to Embodiment 1 includes the projector 100, the polarization conversion device 200, a screen 300, and the polarizing spectacles 400, as shown in FIG. 1. The projector system 1 is a projector system which projects a projection image that can be recognized as a three-dimensional image.

The projector 100 is a three-panel projector which includes three liquid crystal light modulating devices that are transmissive light modulating devices, as light modulating devices, and generates a full-color projection image from red light, green light and blue light. The configuration of the projector 100 is known and therefore will not be described further in detail. The projector 100 alternately emits light that forms a projection image for right eye and light that forms a projection image for left eye, every predetermined period (for example, every 1/60 seconds, every 1/30 seconds or the like) (so-called time division).

The projector 100 is configured to combine each color light modulated by the liquid crystal light modulating devices at a cross dichroic prism, and emits red light and blue light as S-polarized light and green light as P-polarized light.

The polarization conversion device 200 is an external polarization conversion device used for the projector 100 and converts light from the projector 100 to circularly polarized light in a uniform polarization direction (for example, clockwise polarized light as viewed along the optical axis). The polarization conversion device 200 will be described in detail later. The polarization conversion device 200 is arranged in such a way that light emitted from a projection lens of the projector 100 passes along the optical axes of a first element 210 and a second element 220 (described later). In FIG. 1, the polarization conversion device 200 is arranged away from the projector 100. However, the polarization conversion device 200 may be directly attached to the projection lens of the projector 100 or the exterior of the projector 100.

The screen 300 is a projection target of the projector 100. Light emitted from the projector 100 and passing through the polarization conversion device 200 forms a projection image on the screen 300.

The polarizing spectacles 400 are so-called active shutter-type polarizing spectacles having a polarizing shutter for right eye (for example, liquid crystal element) and a polarizing shutter for left eye. The configuration of the polarizing spectacles 400 is known and therefore will not be described further in detail. When in use, the polarizing spectacles 400 are synchronized with the projector 100. When the projector 100 emits light that forms a projection image for right eye, only the polarizing shutter for right eye transmits the light (for example, counterclockwise polarized light as viewed along the optical axis). When the projector 100 emits light that forms a projection image for left eye, only the polarizing shutter for left eye transmits the light. In the drawings and illustrated example, the direction of circularly polarized light differs before and after the screen 300 because the direction of polarization is reversed when the light is reflected by the screen 300. This also applies to Embodiment 2 and Embodiment 4, which will be described later.

Next, the polarization conversion device 200 according to Embodiment 1 will be described.

The polarization conversion device 200 includes a first element 210, a second element 220, a cooling device 230, and cover portions 240, 242, as shown in FIGS. 2A to 2C.

The first element 210 converts light from the projector 100 to polarized light in a uniform polarization direction. More specifically, the first element 210 converts light from the projector 100 to linearly polarized light in a uniform polarization direction.

The first element 210 has a polarizer 212 and a transparent substrate 214.

The polarizer 212 is formed by an absorptive organic polarizer. As the organic polarizer, various organic polarizers (for example, dye-type organic polarizer, iodine-type organic polarizer, polyvinylene block-type organic polarizer, and the like) can be used. Also, an inorganic polarizer can be used instead of the organic polarizer. Moreover, a reflective polarizer can be used instead of the absorptive polarizer.

If red light and blue light are S-polarized light (0 degrees) and green light is P-polarized light (90 degrees) as in this example, it is desirable that the transmission axis of the polarizer 212 is 45 degrees. With such an arrangement, the polarizer 212 absorbs S-polarized light and P-polarized light substantially evenly. Thus, a proper balance among the respective colors can be struck.

The polarizer 212 is arranged on the outside of the transparent substrate 214 (opposite to a space S). With such a configuration, reworking (replacement) of the polarizer 212 becomes easier. Also, with such a configuration, there are no irregularities on the surface of the space S serving as a flow path of the cooling device 230, which will be described later. Consequently, air resistance in the flow path is reduced and cooling efficiency can be improved. This also applies to a ¼ wave plate 222 of the second element 220, which will be described later.

The transparent substrate 214 is equipped with the polarizer 212. The transparent substrate may be preferably made of a material which has a high degree of transparency (a degree to transmit visible light) and does not disturb the state of polarization. For example, a transparent substrate made of various optical glasses can be used. This also applies to a transparent substrate 224, which will be described later.

The same material can be used for the transparent substrate of the first element and the transparent substrate of the second element. However, the transparent substrate of the first element may be preferably made of a material with a higher thermal conductivity than the transparent substrate of the second element. With such a configuration, heat radiation from the first element can be promoted and heat conduction to the ¼ wave plate or the like of the second element can be restrained.

The second element 220 is arranged at a position subsequent to the first element 210 in such a way that the space S exists between the first element 210 and the second element 220. The second element 220 converts polarized light from the first element 210 to predetermined polarized light that is different from the polarized light from the first element 210. More specifically, the second element 220 converts linearly polarized light from the first element 210 to circularly polarized light in a uniform rotation direction.

The second element 220 has a ¼ wave plate 222 and a transparent substrate 224.

The ¼ wave plate 222 is arranged in such a way that an angle formed by the slow axis of the ¼ wave plate 222 and the transmission axis of the polarizer 212 is 45 degrees or 135 degrees.

The cooling device 230 cools the first element 210 and the second element 220. The cooling device 230 is a device which circulates a coolant in the space S between the first element 210 and the second element 220 and thus cools the first element 210 and the second element 220. The cooling device 230 has a blower fan 232 and uses air as the coolant.

The cover portions 240, 242 cover an upper end and lower end of the polarization conversion device 200. By fixing the first element 210 and the second element 220, the cover portions 240, 242 contribute to the coincidence of the optic axes of the first element 210 and the second element 220. Also, by covering the top and bottom of the space S, the cover portions 240, 242 form the flow path of the coolant (air) and improve the cooling effect of the cooling device 230.

Next, advantages of the polarization conversion device 200 and the projector system 1 according to Embodiment 1 will be described.

In the polarization conversion device 200 according to Embodiment 1, since the second element 220 is arranged in such a way that the space S exists between the first element 210 and the second element 220, the space between the first element and the second element can promote heat radiation from the first element and the second element. Consequently, distortion of the optical elements (first element and second element) involved in polarization and deterioration of these optical elements in a short period can be restrained.

Also, in the polarization conversion device 200 according to Embodiment 1, since distortion of the optical elements (first element 210 and second element 220) involved in polarization and deterioration of these optical elements in a short period can be restrained, polarized light in a very good state of polarization (the state showing how uniform the polarized light is) can be generated.

Also, in the polarization conversion device 200 according to Embodiment 1, the space between the first element 210 and the second element 220 can restrain heat conduction from the first element 210 to the second element 220 and can particularly restrain overheating of the second element.

Moreover, since the polarization conversion device 200 according to Embodiment 1 is an external integrated polarization conversion device, the optical axes (transmission axes, slow axes and the like) of the first element and the second element can be accurately aligned by fixing the positional relation between the first element and the second element.

Also, in the polarization conversion device 200 according to Embodiment 1, since the first element and the second element are provided, light emitted from the projector can be projected onto the screen as a projection image formed by light in a uniform polarization direction, as in the case of the related-art polarization conversion device.

Also, in the polarization conversion device 200 according to Embodiment 1, since the cooling device 230 which cools the first element 210 and the second element 220 is provided, the first element and the second element can be actively cooled. Consequently, distortion of the optical elements (first element and second element) involved in polarization and deterioration of these optical elements in a short period can be restrained more effectively.

Moreover, in the polarization conversion device 200 according to Embodiment 1, since the cooling device 230 is a device which circulates a coolant (air) in the space between the first element 210 and the second element 220 and thus cools the first element 210 and the second element 220, the first element and the second element can be cooled efficiently.

Also, in the polarization conversion device 200 according to Embodiment 1, the first element 210 converts light from the projector 100 to linearly polarized light in a uniform polarization direction and the second element 220 converts the linearly polarized light from the first element 210 to circularly polarized light in a uniform rotation direction. Therefore, angle dependence of the polarized light converted by the polarization conversion device can be reduced.

Also, in the polarization conversion device 200 according to Embodiment 1, since the first element 210 has the polarizer 212, the polarization direction of light from the projector can be made uniform.

Moreover, in the polarization conversion device 200 according to Embodiment 1, since the second element 220 has the ¼ wave plate 222, the linearly polarized light from the first element can be converted to circularly polarized light.

The projector system 1 according to Embodiment 1 has the polarization conversion device 200 according to Embodiment 1, in which distortion of the optical elements (first element 210 and second element 220) involved in polarization and deterioration of these optical elements in a short period can be restrained. Therefore, a projector system which is highly reliable and can provide an accurate projection image can be provided.

Also, in the projector system 1 according to Embodiment 1, since a projection image that can be recognized as a three-dimensional image is projected, an accurate three-dimensional image can be projected using the polarization conversion device according to Embodiment 1.

Embodiment 2

Figure 3:
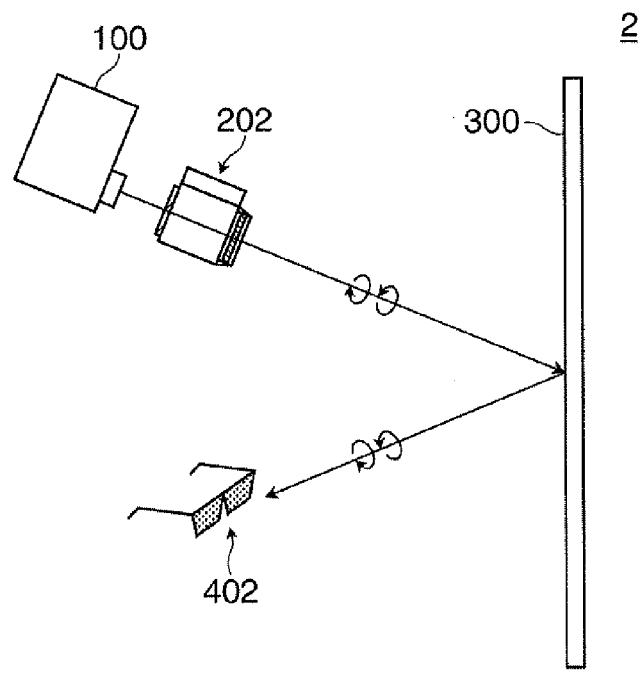
FIG. 3 is an explanatory view of a projector system according to Embodiment 2.

FIG. 3 is an explanatory view of a projector system 2 according to Embodiment 2. In FIG. 3, two circular arrows in different circling directions attached to a solid line with arrow after a polarization conversion device 202 indicate that circularly polarized light in different rotation directions is emitted in a time-divisional manner. This also applies to FIG. 4.

Figure 4:
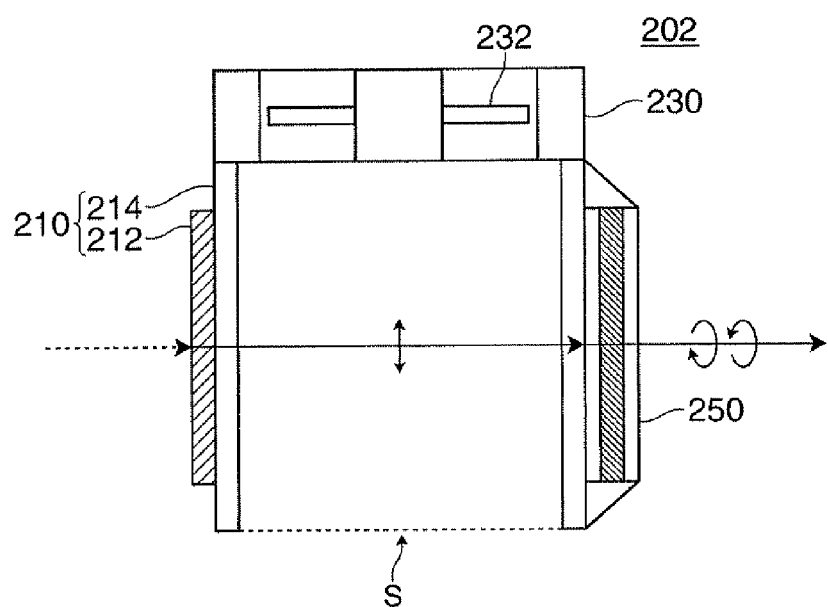
FIG. 4 is a lateral cross-sectional view of a polarization conversion device according to Embodiment 2.

FIG. 4 is a lateral cross-sectional view of the polarization conversion device 202 according to Embodiment 2.

In Embodiment 2 and the subsequent embodiments, components that are not basically different from Embodiment 1 are denoted by the same reference numerals and the description of these components is basically omitted.

The polarization conversion device 202 according to Embodiment 2 has a basically similar configuration to the polarization conversion device 200 according to Embodiment 1 but is different from the polarization conversion device 200 according to Embodiment 1 in the configuration of the second element. Accordingly, the configuration of a projector system 2 according to Embodiment 2 is different from the projector system 1 according to Embodiment 1.

A projector 100 in the projector system 2 has a similar configuration to the projector 100 in the projector system 1 according to Embodiment 1, as shown in FIG. 3, but is different from the projector system 1 according to Embodiment 1 in the configuration of the polarization conversion device and the polarizing spectacles.

In the polarization conversion device 202, a second element 250 has a liquid crystal element, as shown in FIG. 4. The liquid crystal element is a transmissive liquid crystal element including liquid crystal, which is an electro-optic material, airtightly enclosed between a pair of transparent glass substrates, and for example, uses a polysilicon TFT as a switching element. The second element is synchronized with the projector 100. When the projector 100 emits light that forms a projection image for right eye, the second element converts linearly polarized light from the first element 210 to circularly polarized light in a rotation direction aligned with one direction (for example, clockwise as viewed along the optical axis). When the projector 100 emits light that forms a projection image for left eye, the second element converts linearly polarized light from the first element 210 to circularly polarized light in a rotation direction aligned with the other direction (for example, counterclockwise as viewed along the optical axis).

Polarizing spectacles 402 are not active shutter-type polarizing spectacles, unlike the polarizing spectacles 400 in Embodiment 1. The polarizing spectacles 402 include a polarizer for right eye which transmits only a projection image for right eye (for example, counterclockwise polarized light as viewed along the optical axis) and a polarizer for left eye which transmits only a projection image for left eye (for example, clockwise polarized light as viewed along the optical axis) (so-called passive-type). In Embodiment 2, since the polarization conversion device 202 converts the projection image for right eye and the projection image for left eye to different kinds of circularly polarized light, the polarizing spectacles 402 with such a relatively simple configuration can be used.

Thus, the polarization conversion device 202 according to Embodiment 2 is different from the polarization conversion device 200 according to Embodiment 1 in the configuration of the second element. However, since the second element 250 is arranged in such a way that there is a space S between the first element 210 and the second element 250, the space between the first element and the second element can promote heat radiation from the first element and the second element, as in the polarization conversion device 200 according to Embodiment 1. Consequently, distortion of the optical elements (first element and second element) involved in polarization and deterioration of these optical elements in a short period can be restrained.

Also, in the polarization conversion device 202 according to Embodiment 2, the second element 250 has a liquid crystal element and therefore can convert linearly polarized light from the first element to circularly polarized light. Also, the polarization direction of the circularly polarized light can be changed by switching the state of the liquid crystal element.

The polarization conversion device 202 according to Embodiment 2 has a similar configuration to the polarization conversion device 200 according to Embodiment 1, except for the different configuration of the second element from the polarization conversion device 200 according to Embodiment 1. Therefore, the polarization conversion device 202 has the corresponding advantages, of the advantages of the polarization conversion device 200 according to Embodiment 1.

Embodiment 3

A projector system according to Embodiment 3 will be described.

The projector system according to Embodiment 3 is different from Embodiment 1 in the configuration of the polarization conversion device. However, the other components are similar to Embodiment 1 and therefore will not be described further in detail.

Figure 5:
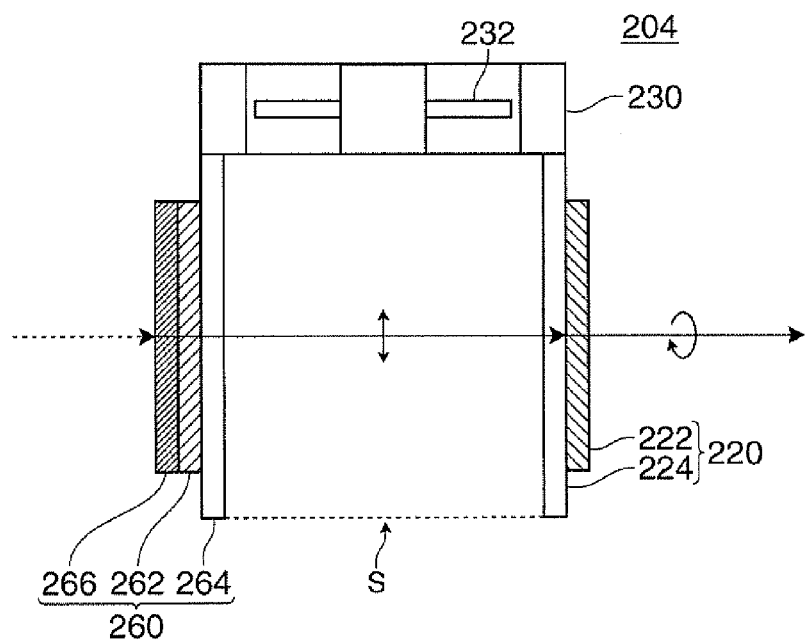
FIG. 5 is a lateral cross-sectional view of a polarization conversion device according to Embodiment 3.

FIG. 5 is a lateral cross-sectional view of a polarization conversion device 204 according to Embodiment 3.

The polarization conversion device 204 according to Embodiment 3 has a basically similar configuration to the polarization conversion device 200 according to Embodiment 1, but is different from the polarization conversion device 200 according to Embodiment 1 in the configuration of the first element. That is, a first element 260 in the polarization conversion device 204 according to Embodiment 3 has a polarizer 262, a transparent substrate 264, and a wavelength-selective polarization rotating element 266, as shown in FIG. 5.

The transparent substrate 264 has a similar configuration to the transparent substrate 214 of Embodiment 1 and therefore will not be described further in detail.

By the way, when the projector is a three-panel liquid crystal projector, three kinds of color light are combined by a cross dichroic prism. In this case, since the cross dichroic prism has optical characteristics such that P-polarized light is dominant as color light that should be transmitted through a dielectric multilayer film whereas S-polarized light is dominant as color light that should be reflected by the dielectric multilayer film, one color light and another color light are emitted as light in different polarization directions from the cross dichroic prism.

The wavelength-selective polarization rotating element 266 converts the directionality of linearly polarized light, only of light with a predetermined wavelength. When the polarization conversion device 204 is applied to the projector 100 of Embodiment 1, a wavelength-selective polarization rotating element which converts only green light from P-polarized light to S-polarized light or which converts red light and blue light from S-polarized light to P-polarized light can be used as the wavelength-selective polarization rotating element 266.

The polarizer 262 has a transmission axis to transmit polarized light of each color that is transmitted without having the state of polarization changed by the wavelength-selective polarization rotating element 266. Thus, a loss due to light absorption by the polarizer 262 can be minimized.

In this way, the polarization conversion device 204 according to Embodiment 3 is different from the polarization conversion device 200 according to Embodiment 1 in the configuration of the first element, but the second element 220 is arranged in such a way that the space S exists between the first element 260 and the second element 220. Therefore, as in the polarization conversion device 200 according to Embodiment 1, the space between the first element and the second element can promote heat radiation from the first element and the second element. Consequently, distortion of the optical elements (first element and second element) involved in polarization and deterioration of these optical elements in a short period can be restrained.

Also, in the polarization conversion device 204 according to Embodiment 3, since the first element 260 has the wavelength-selective polarization rotating element 266, the polarization direction of one light color or another light color can be selectively converted and the polarization direction of light from the projector can be made uniform efficiently.

The polarization conversion device 204 according to Embodiment 3 has a similar configuration to the polarization conversion device 200 according to Embodiment 1, except for the difference in the configuration of the first element from the polarization conversion device 200 according to Embodiment 1. Therefore, the polarization conversion device 204 has the corresponding advantages, of the advantages of the polarization conversion device 200 according to Embodiment 1.

Embodiment 4

Figure 6:
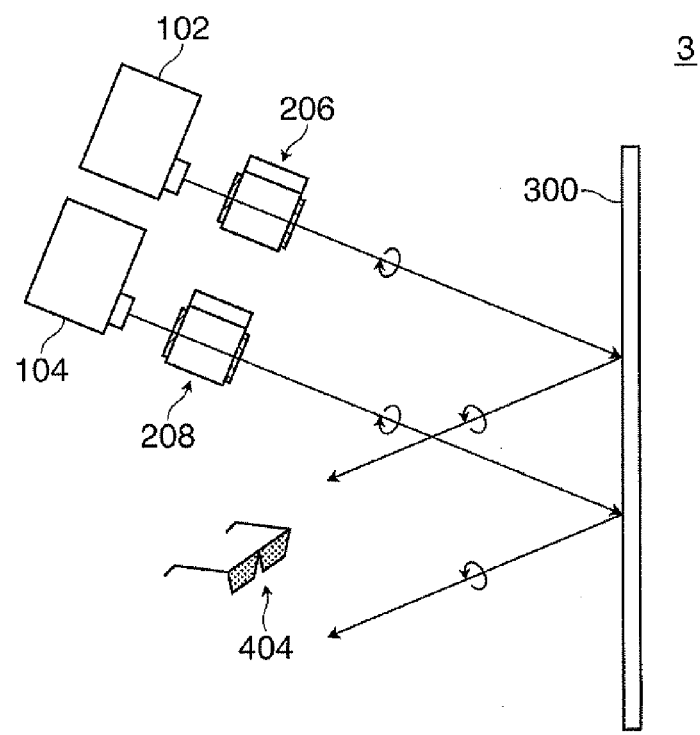
FIG. 6 is an explanatory view of a projector system according to Embodiment 4.

FIG. 6 is an explanatory view of a projector system 3 according to Embodiment 4.

The projector system. 3 according to Embodiment 4 has a basically similar configuration to the projector system 1 according to Embodiment 1 but is different from the projector system 1 according to Embodiment I in the number of projectors and polarization conversion devices. That is, the projector system 3 according to Embodiment 4 includes tow projectors 102, 104, and polarization conversion devices 206, 208 (so-called stacked projector system), as shown in FIG. 6. Accordingly, the configuration of polarizing spectacles 404, too, is different from the configuration of the polarizing spectacles 400 of Embodiment 1.

The configuration of each of the projectors 102, 104 is similar to the projector 100 of Embodiment 1. However, the projector 102 and the projector 104 project light that forms different projection images. For example, the projector 102 projects light that forms a projection image for left eye and the projector 104 projects light that forms a projection image for right eye.

The configuration of each of the polarization conversion devices 206, 208 is basically similar to polarization conversion device 200 according to Embodiment 1. However, the polarization conversion device 206 corresponds to the projector 102 and the polarization conversion device 208 corresponds to the projector 104. The polarization conversion device 206 converts, for example, the light that forms a projection image for left eye from the projector 102 to circularly polarized light in a rotation direction aligned with one direction (for example, counterclockwise as viewed along the optical axis). The polarization conversion device 208 converts, for example, the light that forms a projection image for right eye from the projector 104 to circularly polarized light in a rotation direction aligned with the other direction (for example, clockwise as viewed along the optical axis).

The polarizing spectacles 404 have a similar configuration to the polarizing spectacles 402 of Embodiment 2 and therefore will not be described further in detail.

In this way, the projector system 3 according to Embodiment 4 includes a different number of projectors and polarization conversion devices from the projector system 1 according to Embodiment 1, but includes the polarization conversion devices 206, 208 according to Embodiment 4 in which distortion of the optical elements (first element and second element) involved in polarization and deterioration of these optical elements in a short period can be restrained. Therefore, the projector system 3 can be a projector system which is highly reliable and can provide an accurate projection image, similarly to the projector system 1 according to Embodiment 1.

The projector system 3 according to Embodiment 4 has a similar configuration to the projector system 1 according to Embodiment 1, except for the number of projectors and polarization conversion devices. Therefore, the projector system 3 has the advantages of the projector system 1 according to Embodiment 1.

Embodiment 5

Figure 7A:
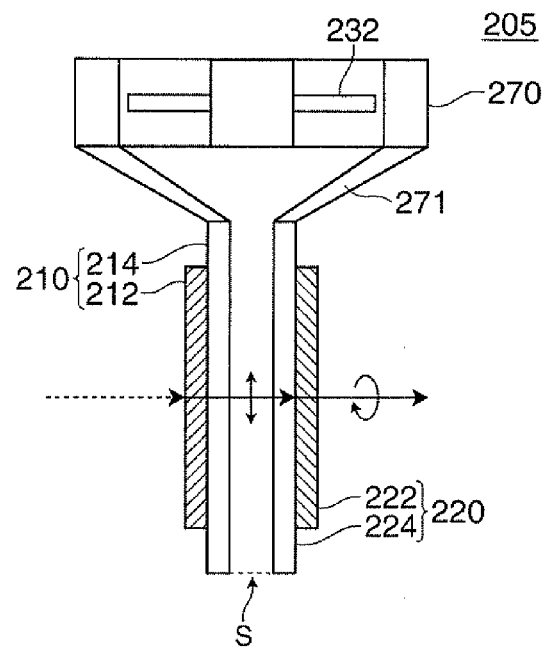
FIGS. 7A and 7B are lateral cross-sectional views of polarization conversion devices according to Embodiment 5.
Figure 7B:
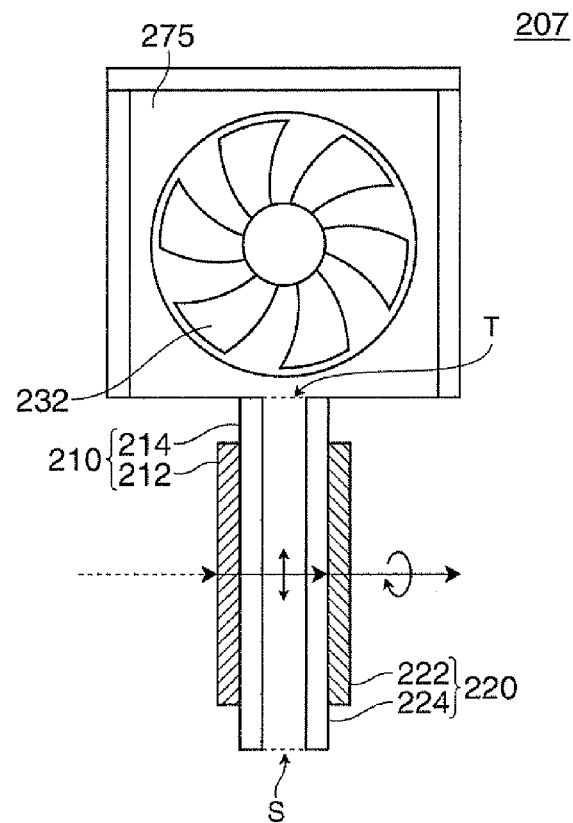

FIGS. 7A and 7B are lateral cross-sectional views of polarization conversion devices 205, 207 according to Embodiment 5.

The polarization conversion device 205 according to Embodiment 5 has a basically similar configuration to the polarization conversion device 200 according to Embodiment 1 but is different from the polarization conversion device 200 according to Embodiment 1 in the configuration of the cooling device. That is, a cooling device 270 in the polarization conversion device 205 according to Embodiment 5 has a duct 271 between a fan 232 and a space S, as shown in FIG. 7A.

The duct 271 has the effect of making the space between the first optical element and the second optical element narrower than the outer shape of the fan 232. With this configuration, an enhanced cooling effect due to a rise in wind speed of cooling wind, and reduction in size of the polarization conversion device 205 due to the closeness of the second optical element 220 to the projector 100 can be realized.

Also, in a cooling device 275 in the polarization conversion device 207 according to Embodiment 5, a fan 232 is arranged at the position of a space T next to a space S, as shown in FIG. 7B. Since there is no wall between the space S and the space T, a rise in the wind speed in the space T by the fan 232 causes a negative pressure to be generated in the space S and causes the air in the space S to flow. With this configuration, too, the space between the first optical element and the second optical element can be narrowed. Therefore, the second optical element 220 can be arranged closely to the projector 100 and the polarization conversion device 207 can be reduced in size.

Although the invention is described based on the embodiments, the invention is not limited to the embodiments. Various other embodiments can be carried out without departing from the scope of the invention. For example, the following modifications can be made.

(1) The dimensions, number of elements, materials and shapes of each component described in the embodiments are examples and can be changed without losing the advantages of the invention.

(2) In each of the embodiments, the direction of the flow of the coolant generated by the cooling device is horizontal in the polarization conversion devices 200 to 206. However, the invention is not limited to this configuration. For example, an arrangement in which an upward (vertical) flow of the coolant from below is generated, thus enabling easy intake of cold air from below when the projector is suspended from the ceiling, or an arrangement which enables easy intake of air from above where there is enough space when the projector is installed on the floor or desk, may be selected. Also, by enabling an external integrated polarization conversion device to be installed upside down, an optimum configuration corresponding to the arrangement of the projector can be selected.

(3) In Embodiment 2, the second element having the liquid crystal element which converts linearly polarized light to circularly polarized light is used. However, the invention is not limited to this configuration. A second element having a liquid crystal element which converts linearly polarized light to linearly polarized light in a different polarization direction and a ¼ wave plate which converts linearly polarized light to circularly polarized light may be used.

(4) In Embodiment 3, the first element having the polarizer and the wavelength-selective polarization rotating element is used. However, the invention is not limited to this configuration. If polarized light in a uniform polarization direction can be created simply with a wavelength-selective polarization rotating element, a first element which has a wavelength-selective polarization rotating element and does not have a polarizer may be used.

(5) In Embodiments 1, 2 and 4, the projector including three liquid crystal light modulating devices which are transmissive light modulating devices is used. However, the invention is not limited to this configuration. A projector including reflective liquid crystal light modulating devices may also be used. Also, a projector including two or less liquid crystal light modulating devices, or four or more liquid crystal light modulating devices may be used.

(6) In Embodiments 1, 2 and 4, the projector including liquid crystal light modulating devices is used. However, the invention is not limited to this configuration. Generally, a projector having a light modulating device which modulates incident light according to image information may be used. A projector having a micromirror-type light modulating device or the like may also be used. As a micromirror-type light modulating device, for example, a DMD (digital micromirror device) (trademark of Texas Instruments) can be used. In a projector system including such a projector, since non-polarized light becomes incident on the polarization conversion device, about a half of the light is absorbed in the polarization conversion device and the problem of overheating of optical elements is serious. Therefore, the polarization conversion device of the invention can effectively be used particularly in such a projector system.

The entire disclosure of Japanese Patent Application No. 2011-270966, filed Dec. 12, 2011 is expressly incorporated by reference herein.

What is claimed is:

1. An external polarization conversion device used for a projector, comprising:
a first element that converts light from the projector to polarized light in a uniform polarization direction;
a second element that is arranged in a position subsequent to the first element in such a way that there is a space between the first element and the second element and that converts the polarized light from the first element to predetermined polarized light that is different from the polarized light from the first element;
a cooling device that circulates a coolant in the space and thereby cools the first element and the second element; and
a pair of cover portions that fix the first element and the second element,
the pair of cover portions covering the space and forming a flow path of the coolant from the cooling device.

2. The external polarization conversion device according to claim 1, wherein the second element converts the linearly polarized light from the first element to circularly polarized light in a uniform rotation direction.

3. A projector system comprising:
a projector; and
the external polarization conversion device according to claim 1.

4. A projector system comprising:
a projector; and
the external polarization conversion device according to claim 2.

5. The projector system according to claim 3, wherein a projection image that can be recognized as a three-dimensional image is projected.

6. The projector system according to claim 4, wherein a projection image that can be recognized as a three-dimensional image is projected.

* * * * *